(12) United States Patent
Zhou

(10) Patent No.: US 10,947,130 B2
(45) Date of Patent: Mar. 16, 2021

(54) MINIMAL HIGH-EFFICIENT AIR FLOATATION MACHINE AND METHOD

(71) Applicant: NINGBO SHANGFUYUAN ENVIRONMENTAL TECHNOLOGY CO., LTD., Ningbo (CN)

(72) Inventor: Chunjiang Zhou, Ningbo (CN)

(73) Assignee: NINGBO SHANGFUYUAN ENVIRONMENTAL TECHNOLOGY CO. LTD, Ningbo (CN)

( * ) Notice: Subject to any disclaimer, the term of this patent is extended or adjusted under 35 U.S.C. 154(b) by 257 days.

(21) Appl. No.: 16/145,388

(22) Filed: Sep. 28, 2018

(65) Prior Publication Data

US 2020/0017373 A1    Jan. 16, 2020

(30) Foreign Application Priority Data

Jul. 13, 2018   (CN) .......................... 201810767294.9
Jul. 13, 2018   (CN) .......................... 201821107514.7

(51) Int. Cl.
| | |
|---|---|
| *C02F 1/24* | (2006.01) |
| *C02F 1/52* | (2006.01) |
| *B03D 1/14* | (2006.01) |
| *C02F 1/68* | (2006.01) |

(52) U.S. Cl.
CPC .................. *C02F 1/24* (2013.01); *C02F 1/52* (2013.01); *C02F 1/685* (2013.01); *B03D 1/1431* (2013.01); *C02F 2201/002* (2013.01)

(58) Field of Classification Search
None
See application file for complete search history.

(56) References Cited

U.S. PATENT DOCUMENTS

2013/0118988 A1 * 5/2013 Xu ............................ C02F 9/00
                                                                        210/707
2016/0016816 A1 * 1/2016 Anderson ................ B03D 1/24
                                                                        210/703

* cited by examiner

*Primary Examiner* — Philip Y Louie
(74) *Attorney, Agent, or Firm* — Charles C. Achkar; Ostrolenk Faber LLP

(57) ABSTRACT

A minimal high-efficient air floatation machine includes an air floatation pool body, a spiral water input pipeline, a return pump, an inflation pipeline and a dissolved gas pipeline. Upper and lower ends of the air floatation pool body are cones having a scum output pipeline and a height adjustable water output pipeline. The spiral water input pipeline has chemical addition ports (a), (b). By mixing chemicals with the sewage at high speed in the water input pipeline, a quick fully-mixed effect is achieved. The scum output pipeline is disposed at the top of the upper cone of the air floatation machine for adjusting the height adjustable water output pipeline to output scum automatically. The outlet of the return pump has the inflation pipeline and dissolved gas pipeline. The inflation pipeline enters into the inlet of the return pump to achieve automatic inflation after air is sucked into the Venturi tube.

11 Claims, 1 Drawing Sheet

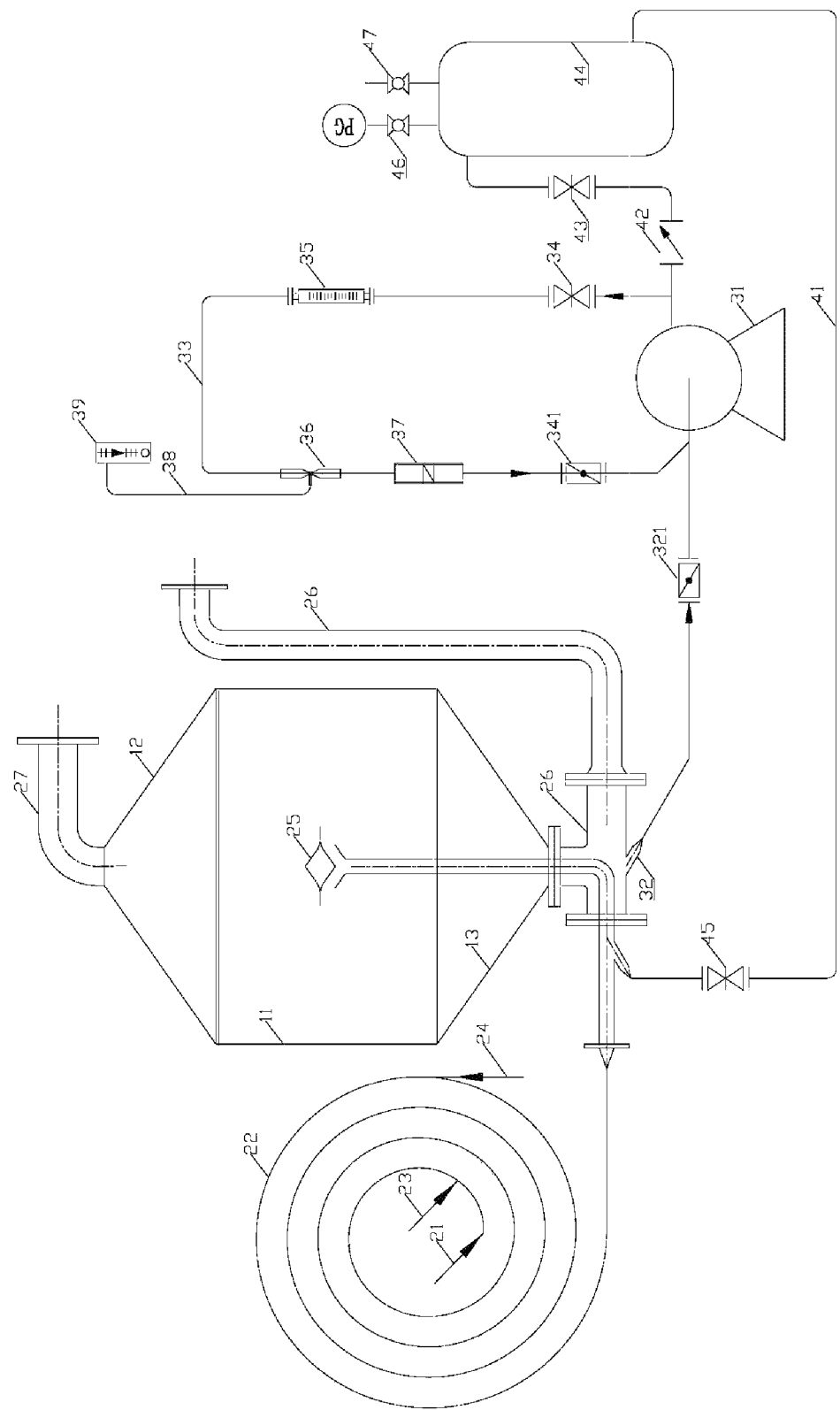

MINIMAL HIGH-EFFICIENT AIR FLOATATION MACHINE AND METHOD

CROSS REFERENCE TO RELATED APPLICATIONS

The present application claims priority to China Application No. 201810767294.9 filed on Jul. 13, 2018 and China Application No. 201821107514.7 filed Jul. 13, 2018, the subject matter of each of which are incorporated herein by reference in their entirety.

FIELD OF INVENTION

The present invention relates to the field of sewage treatment, in particular to a minimal high-efficient air floatation machine.

BACKGROUND OF INVENTION

1. Description of the Related Art

Air floatation (AF) is short for an air floatation machine and may also be used as a terminology, such as an air floatation method for water treatment. In other words, highly-dispersed tiny bubbles are formed in water and used for adhering solid or liquid particles of the hydrophobic groups in sewage to form a three-phase (water-air-particle) mixture. After the particles are adhered to the air bubbles, flocs with a surface density smaller than that of water are formed and float up to water surface, thus resulting in scraping the scum layer to achieve the solid-liquid or liquid-liquid separation effect.

Air floatation is an important solid-liquid separation device in sewage treatment, and has the features of low entry of investment, small footprint, and high level of automation. In the conventional air floatation equipment, there are too many mechanical devices that consume too much water and cause an accumulation of mud at the bottom of the pool easily. In addition, the mechanical devices of the conventional air floatation equipment primarily include a mixer (for mixing the sewage with chemicals for flocculation and coagulation reactions), a gas dissolver (a return pump operated together with an air compressor, or a multiphase dissolved air pump), and a scraper. The multiphase dissolved air pump is high priced. Furthermore, the input suction of the pump is much lower than the output spray of the pump, and the air suction can be achieved only by the compression at the input pipeline, thus resulting in high power consumption and low efficiency. In some applications, air floatation pools further require the installation of a rear hood.

2. Summary of the Invention

Therefore, it is a primary objective of the present invention to overcome the aforementioned drawbacks by providing a minimal high-efficiency air floatation machine with a simple structure, a low water and power consumption, and a mud-free pool bottom.

To achieve the aforementioned and other objectives, the present invention provides a minimal high-efficient air floatation machine, comprising an air floatation pool body, a spiral water input pipeline, a return pump, an inflation pipeline and a dissolved gas pipeline; wherein the air floatation pool body has a scum output pipeline matched and coupled to the top of the air floatation pool body and a water output pipeline the air floatation pool body matched and coupled to the bottom of the air floatation pool body; the spiral water input pipeline has a chemical addition port a disposed at a water inlet and an end matched and penetrated to the air floatation pool body; the return pump and the water output pipeline are matched, penetrated and coupled to each other, and the inflation pipeline and the return pump are matched and coupled to each other; and the dissolved gas pipeline is matched and coupled to the return pump and an end of the spiral water input pipeline.

Wherein, the air floatation pool body has an upper cone at the top opening of the air floatation pool body and a lower cone at the bottom of the air floatation pool body, and a closed air floatation pool is formed and enclosed by the upper cone, air floatation pool body and lower cone; and the scum output pipeline is matched, penetrated and coupled to the top of the upper cone, and the water output pipeline is matched, penetrated and coupled to the bottom of the lower cone.

Wherein, the water output pipeline has a height adjustable upwardly with respect to the pipeline after the bottom of the lower cone is coupled to the outside.

Wherein, the spiral water input pipeline has an end sheathed and coupled to the water output pipeline and penetrates perpendicularly upward from an interface between the water output pipeline and the lower cone and deeply into the air floatation pool body.

Wherein, the spiral water input pipeline is passed deeply into an end of the air floatation pool body to form a double-layer trumpet structure.

Wherein, the water output pipeline has a return pump inlet matched, penetrated and coupled to the return pump through a manual valve a.

Wherein, the inflation pipeline comprises a manual globe valve a, a liquid flow meter, a Venturi tube, a pipe mixer and a manual valve b sequentially coupled to one another, and the Venturi tube is matched and coupled to an external penetrating gas flow meter through an air pipe.

Wherein, the dissolved gas pipeline comprises a check valve, a manual globe valve b, a dissolved gas pressure regulation can and a manual globe valve c sequentially coupled to one another; the outlet of the return pump is matched and coupled to the check valve, and the check valve is provided for preventing the passing fluid from returning to the return pump; the manual globe valve c is matched, penetrated and coupled to an end of the spiral water input pipeline; and the dissolved gas pressure regulation can has a pressure relief valve matched and coupled to the pressure gauge.

Wherein, the spiral water input pipeline has a chemical addition port b disposed at a middle section of the spiral water input pipeline.

Wherein, the spiral water input pipeline is coiled onto an outer side of the air floatation pool body.

An air floatation method applied to a minimal high-efficiency air floatation machine comprises the following steps:

(a) Enter sewage from a water inlet of a spiral water input pipeline, while adding chemicals from a chemical addition port a and a chemical addition port b into the spiral water input pipeline, wherein both sewage and chemicals are spun, mixed, and reacted in the spiral water input pipeline to form a floc (b) Pass the sewage with the floc obtained in the step (a) from the spiral water input pipeline through the bottom of the lower cone into the air floatation pool body.

(c) Enter the sewage that passes into the air floatation pool body through the water output pipeline and manual valve a into the return pump.

(d) Enter a part of the sewage contained in the return pump into the inflation pipeline, adjust the opening level of the manual globe valve a, and enter the liquid flow meter and Venturi tube. Pass the sewage through a tapered throat of the Venturi tube to produce a negative pressure to suck air from the gas flow meter, and mix the air entering into the Venturi tube through the air pipe and further use a pipe mixer for the air mixing and a manual valve b for an adjustment, and return the air to the return pump.

(e) Pump the remaining sewage from the return pump through the check valve and manual globe valve b into the dissolved gas pressure regulation can; dissolve the air contained in the sewage in the dissolved gas pressure regulation can at a specific pressure condition and enter the dissolved air in the sewage; build up the pressure of the sewage by the manual globe valve c after the air is dissolved, and enter the dissolved air from the dissolved gas pipeline into an end of the spiral water input pipeline, and mix the air with the sewage of the dosing reaction to form a mixture of aerated water and reacted floc, and disperse the air guided by the double-layer trumpet structure as a standard flow to the surrounding and enter the air into the air floatation pool body (f) Place the mixture of the aerated water and the reacted floc formed in the step (e) into the air floatation pool body, lift the floc by tiny air bubbles to form a scum, adjust the water output pipeline to an appropriate height, so that the scum floats to the upper cone and enters into the scum output pipeline automatically; and flow the sewage water into the water output pipeline of the lower cone.

In an embodiment, a part of the sediment contained in the sewage water and entering into the water output pipeline of the lower cone is sucked into the return pump as described in the step (c)

Compared with the prior art, the present invention has the following advantages and effects. Chemicals and sewage are spun at a high speed in the water input pipeline to achieve the effect of quick mixing and complete reaction and omit the mixer for the flocculation and coagulation reactions. The scum output pipeline is provided at the top of the upper cone of the air floatation machine and capable of adjusting its height in correspondence with the height water output pipeline to achieve the effect of outputting the scum automatically and omit the scraper use for scraping the scum. The inflation pipeline and dissolved gas pipeline are provided at the outlet of the return pump, such that after the Venturi tube of the inflation pipeline sucks air into the return pump inlet, the invention achieves the automatic inflation effect and omits the air compressor as well as the expensive multiphase dissolved air pump; and the air floatation pool body, upper cone and lower cone constitute a closed structure to prevent spills of exhaust gas and omit the exhaust gas hood.

BRIEF DESCRIPTION OF THE DRAWINGS

The FIGURE is a schematic view of a minimal high-efficient air floatation machine in accordance with the present invention.

DESCRIPTION OF THE PREFERRED EMBODIMENTS

To make it easier for our examiner to understand the objective, technical characteristics, structure, innovative features, and performance of the invention, we use preferred embodiments together with the attached drawings for the detailed description of the invention. It is intended that the embodiments and drawings disclosed herein are to be considered illustrative rather than restrictive.

With reference to the FIGURE for a schematic view of a minimal high-efficient air floatation machine in accordance with the present invention, the minimal high-efficient air floatation machine comprises an air floatation pool body 11, a spiral water input pipeline 22, a return pump 31, an inflation pipeline 33, and a dissolved gas pipeline 41. The FIGURE shows the connection relationship of these components and the mechanical assemblies of the inflation pipeline 33 and dissolved gas pipeline 41.

In the FIGURE, the minimal high-efficient air floatation machine comprises an air floatation pool body 11, a spiral water input pipeline 22, a return pump 31, an inflation pipeline 33 and a dissolved gas pipeline 41, wherein the air floatation pool body 11 has a scum output pipeline 27 matched and coupled to the top of the air floatation pool body 11 and a water output pipeline 26 matched and coupled to the bottom of the air floatation pool body 11; the spiral water input pipeline 22 has a water inlet 21 with a chemical addition port a 23, and an end of the spiral water input pipeline 22 is matched and penetrated with the air floatation pool body 11; the return pump 31 and the water output pipeline 26 are matched, penetrated and coupled to each other, and the inflation pipeline 33 and the return pump 31 are matched and coupled to each other; the dissolved gas pipeline 41 is matched and coupled to the return pump 31 and an end of the spiral water input pipeline 22. The present invention adopts a high-speed spin in the spiral water input pipeline to achieve the effects of quick mixing and complete reaction to omit the mixer and reaction pool used for the flocculation and coagulation reactions. Obviously, the invention is useful and cost-effective.

In an embodiment as shown in the FIGURE, the air floatation pool body 11 has an upper cone 12 at the top opening of the air floatation pool body 11 and a lower cone 13 at the bottom of the air floatation pool body 11, and an air floatation pool is formed and enclosed by the upper cone 12, air floatation pool body 11 and lower cone 13 to prevent spills of exhaust gas and omit the exhaust gas hood; the scum output pipeline 27 is matched, penetrated and coupled to the top of the upper cone 12, and the water output pipeline 26 is matched, penetrated and coupled to the bottom of the lower cone 13. Wherein, the upper cone 12 and the air floatation pool body 11 may be fixed or detachably coupled to each other. In addition, the air floatation pool body 11 is in a circular, square, or polygonal shape. If the air floatation pool body 11 is in a square shape, there may be one or multiple of the following three groups: the upper cone 12 and the lower cone 13, the spiral water input pipeline 22 and the dissolved gas pipeline 41, and the water output pipeline 26 and the scum output pipeline 27.

In an embodiment, the water output pipeline 26 has a height adjustable upwardly with respect to the pipeline after the bottom of the lower cone 13 is coupled to the outside to achieve the effect of gushing the scum out from the scum output pipeline 27 continuously and automatically, so as to omit the scraper generally used in the air floatation machine. Wherein, the water output pipeline 26 may be a soft pipe, a bellow, a hard pipe, or any combination of the above.

In an embodiment, the spiral water input pipeline 22 has an end sheathed and coupled to the water output pipeline 26 and penetrates perpendicularly upward from an interface between the water output pipeline 26 and the lower cone 13 and deeply into the air floatation pool body 11.

In an embodiment, the spiral water input pipeline 22 is passed deeply into an end of the air floatation pool body 11 to form a double-layer trumpet structure 25, so that the mixture of the aerated water and the reacted floc so formed is guided by the double-layer trumpet structure 25 as a standard flow and dispersed to the surrounding.

In an embodiment, the water output pipeline 26 comprises a return pump inlet 32 matched, penetrated and coupled to a return pump 31 and a return pump inlet 32 through a manual valve a 321, so that the flow of sewage entering into the return pump 31 can be adjusted and controlled manually.

In an embodiment, the inflation pipeline 33 comprises a manual globe valve a 34, a liquid flow meter 35, a Venturi tube 36, a pipe mixer 37 and a manual valve b 341, and the Venturi tube 36 is matched and coupled to an external penetrating gas flow meter 39 through an air pipe 38, so that the invention can complete the sewage inflation process without using the air compressor or the expensive multiphase dissolved air pump, thus not just lowering the equipment cost only, but also reducing the occupied space as well as guaranteeing a stable and continuous inflation of the sewage. The invention is useful and cost-effective.

In an embodiment, the dissolved gas pipeline 41 comprises a check valve 42, a manual globe valve b 43, a dissolved gas pressure regulation can 44 and a manual globe valve c 45 sequentially coupled to one another; and the outlet of the return pump 31 is matched and coupled to the check valve 42, and the check valve 42 is provided for preventing the passing fluid from returning to the return pump 31; the manual globe valve c 45 is matched, penetrated, and coupled to an end of the spiral water input pipeline 22; a pressure gauge 46 and a pressure relief valve 47 are disposed on and matched and coupled to the dissolved gas pressure regulation can 44 to facilitate operators to view the pressure intensity of the dissolved gas pressure regulation can 44 clearly, and a pressure relief valve 47 is provided for stabilizing the pressure in the dissolved gas pressure regulation can 44.

In an embodiment, the chemical addition port b 24 is disposed at a middle section of the spiral water input pipeline 22 for promoting a fully mixed reaction between the chemical and the sewage.

In an embodiment, the spiral water input pipeline 22 is coiled onto an outer side of the air floatation pool body 11, so as to decrease the footprint of the product. Wherein, the spiral water input pipeline 22 is a planar spiral form or a spring spiral form.

In an embodiment, an air floatation method applied to the minimal high-efficient air floatation machine comprises the following steps:

(a) Enter sewage from a water inlet 21 of a spiral water input pipeline 22, while adding chemicals from a chemical addition port a 23 and a chemical addition port b 24 into the spiral water input pipeline 22, and both sewage and chemicals are spun, mixed, and reacted in the spiral water input pipeline 22 to form a floc.

(b) Pass the sewage with the floc obtained in the step (a) from the spiral water input pipeline 22 through the bottom of the lower cone 13 into the air floatation pool body 11.

(c) Enter the sewage that passes into the air floatation pool body 11 through the water output pipeline 26 and manual valve a 321 into the return pump 31.

(d) Enter a part of the sewage contained in the return pump 31 into the inflation pipeline 33, adjust the opening level of the manual globe valve a 34, and enter the liquid flow meter 35 and Venturi tube 36; pass the sewage through a tapered throat of the Venturi tube 36 to produce a negative pressure to suck air from the gas flow meter 39, and mix the air entering into the Venturi tube 36 through the air pipe 38 and further use a pipe mixer 37 for the air mixing and a manual valve b 341 for an adjustment, and enter the air into the return pump 31.

(e) Pump the remaining sewage from the return pump through the check valve 42 and manual globe valve b 43 into the dissolved gas pressure regulation can 44. Dissolve the air contained in the sewage in the dissolved gas pressure regulation can 44 at a specific pressure condition and entering the dissolved air in the sewage. Build up the pressure of the sewage by the manual globe valve c 45 after the air is dissolved, and enter the dissolved air from the dissolved gas pipeline 41 into an end of the spiral water input pipeline 22, and mix the air with the sewage of the dosing reaction to form a mixture of aerated water and reacted floc, and disperse the air guided by the double-layer trumpet structure 25 as a standard flow to the surrounding and enter into the air floatation pool body 11.

(f) Place the mixture of the aerated water and the reacted floc formed in the step (e) into the air floatation pool body 11, lift the floc by tiny air bubbles to form a scum, adjust the water output pipeline 26 to an appropriate height, so that the scum floats to the upper cone 12 and enters into the scum output pipeline 27 automatically; and flow the sewage water into the water output pipeline 26 of the lower cone 13.

In an embodiment, a part of the sediment contained in the sewage water and entering into the water output pipeline 26 of the lower cone 13 is sucked into the return pump 31 as described in the step (c).

In an operation of the air floatation machine of this invention, the sewage entering from the water inlet 21 of the spiral water input pipeline 22 is mixed with the chemicals inputted from the chemical addition port a 23 and the chemical addition port b 24 respectively and spun and reacted in the spiral water input pipeline 22 to form a floc and then the mixture is entered from the lower cone 13 into the air floatation pool body 11. This reaction method omits the mixer and reaction pool used for the flocculation and coagulation reactions. The return pump inlet 32 is coupled to the water output pipeline 26 at the bottom of the lower cone 13, so that the sewage can be entered into the return pump 31 through the water output pipeline 26 and the manual valve a, wherein a part of the sewage enters into the inflation pipeline 33 of the return pump 31. After the opening level of the manual globe valve a 34 is adjusted, the sewage enters into the liquid flow meter 35 and the Venturi tube 36 and flows through the tapered throat of the Venturi tube 36 to produce a negative pressure for sucking air from the gas flow meter 39. After the air enters into the Venturi tube 36 through the air pipe 38, the air is mixed with the sewage and further mixed by the pipe mixer 37. After the manual valve b 341 is adjusted, the mixture is turned to the return pump 31. The inflation of the sewage can be achieved without the air compressor or the expensive multiphase dissolved air pump. The remaining sewage is pumped to the outside by the return pump 31 and entered into the dissolved gas pressure regulation can 44 through the check valve 42 and the manual globe valve b 43. The sucked air is dissolved into the sewage inside the dissolved gas pressure regulation can 44 at a specific pressure condition. After the air is dissolved into the sewage, the pressure of the sewage is built up by the manual globe valve c and then entered from the dissolved gas pipeline 41 into an end of the spiral water input pipeline 22 and finally mixed with the sewage of the dosing reaction to form a mixture of the aerated water and the reacted floc. The mixture is guided by the double-layer trumpet structure 25 as a standard flow and dispersed to the surrounding, and the floc is lifted by micro air bubbles to form a scum which floats to the upper cone 12 and enters into the scum output pipeline 27. The sewage water flows into the water output pipeline 26 of the lower cone 13. Wherein, the height of the water output pipeline 26 is adjustable to achieve the effect of gushing the scum out from the scum output pipeline 27 to the outside automatically and continuously, so as to omit the scraper generally used in the air floatation machine. Even if some sediments in the sewage water enter into the water output pipeline 26 of the lower cone 13, such sediments will be sucked to the outside by the return pump 31 to remove the scam continuously produced by the action of the micro air bubbles. The invention overcomes the sediment issue of the conventional air floatation machine. In addition, the air floatation pool body 11, upper cone 12 and lower cone 13 of the invention form a closed structure to prevent spills of exhaust gas and omit the exhaust gas hood. The invention also has the advantages of simplified mechanical parts and low power consumption.

While the invention has been described by means of specific embodiments, numerous modifications and variations could be made thereto by those skilled in the art without departing from the scope and spirit of the invention set forth in the claims.

What is claimed is:

1. A minimal high-efficient air floatation machine, comprising: an air floatation pool body, a spiral water input pipeline, a return pump, an air intake pipeline and a dissolved gas pipeline, wherein the air floatation pool body has a scum output pipeline coupled to the top of the air floatation pool body, and a water output pipeline coupled to the bottom of the air floatation pool body; the spiral water input pipeline has a chemical addition port (a) at a water inlet, and an end of the spiral water input pipeline is in communication with the air floatation pool body; the return pump and the water output pipeline are coupled to each other, and the air intake pipeline and the return pump are coupled to each other; and the dissolved gas pipeline is coupled to the return pump and an end of the spiral water input pipeline;
wherein the air intake pipeline comprises a manual globe valve (a), a liquid flow meter, a Venturi tube, a pipe mixer and a manual valve (b) sequentially coupled to one another, and the Venturi tube is coupled to a gas flow meter through an air pipe.

2. The minimal high-efficient air floatation machine of claim 1, wherein the air floatation pool body has an upper cone at the top opening of the air floatation pool body and a lower cone at the bottom opening of the air floatation pool body, and an air floatation pool is formed and enclosed by the upper cone, air floatation pool body and lower cone; the scum output pipeline is coupled to the top of the upper cone, and the water output pipeline is coupled to the bottom of the lower cone.

3. The minimal high-efficient air floatation machine of claim 2, wherein the water output pipeline has a height adjustable upwardly with respect to the pipeline after the bottom of the lower cone is coupled to the outside.

4. The minimal high-efficient air floatation machine of claim 1, wherein the water output pipeline has a return pump inlet coupled to the return pump through a manual valve (a).

5. The minimal high-efficient air floatation machine of claim 1, wherein the dissolved gas pipeline comprises a check valve, a manual globe valve (b), a dissolved gas pressure regulation can and a manual globe valve (c) sequentially coupled to one another; the return pump has an outlet coupled to the check valve, and the check valve prevents flowing fluid from returning to the return pump; the manual globe valve (c) is coupled to an end of the spiral water input pipeline; and the dissolved gas pressure regulation can has a pressure gauge and a pressure relief valve disposed thereon and coupled thereto.

6. The minimal high-efficient air floatation machine of claim 1, wherein the spiral water input pipeline has a chemical addition port (b) disposed at a middle section of the spiral water input pipeline.

7. The minimal high-efficient air floatation machine of claim 1, wherein the spiral water input pipeline is coiled onto an outer side of the air floatation pool body.

8. A minimal high-efficient air floatation machine, comprising: an air floatation pool body, a spiral water input pipeline, a return pump, an air intake pipeline and a dissolved gas pipeline, wherein the air floatation pool body has a scum output pipeline coupled to the top of the air floatation pool body, and a water output pipeline coupled to the bottom of the air floatation pool body; the spiral water input pipeline has a chemical addition port (a) at a water inlet, and an end of the spiral water input pipeline is in communication with the air floatation pool body; the return pump and the water output pipeline are coupled to each other, and the air intake pipeline and the return pump are coupled to each other; and the dissolved gas pipeline is coupled to the return pump and an end of the spiral water input pipeline;
wherein the air floatation pool body has an upper cone at the top opening of the air floatation pool body and a lower cone at the bottom opening of the air floatation pool body, and an air floatation pool is formed and enclosed by the upper cone, air floatation pool body and lower cone; the scum output pipeline is coupled to the top of the upper cone, and the water output pipeline is coupled to the bottom of the lower cone;
wherein the spiral water input pipeline has an end sheathed and coupled to the water output pipeline and penetrates perpendicularly upward from an interface between the water output pipeline and the lower cone and deeply into the air floatation pool body such that the end of the spiral water input pipeline is at a center of the air floatation pool body.

9. The minimal high-efficient air floatation machine of claim 8, wherein the end of the spiral water input pipeline forms a double-layer trumpet structure.

10. An air floatation method, applied to a minimal high-efficient air floatation machine, the minimal high-efficient air floatation machine comprising: an air floatation pool body, a spiral water input pipeline, a return pump, an air intake pipeline and a dissolved gas pipeline, wherein the air floatation pool body has a scum output pipeline coupled to the top of the air floatation pool body, and a water output pipeline coupled to the bottom of the air floatation pool body; the spiral water input pipeline has a chemical addition port (a) at a water inlet, and an end of the spiral water input pipeline is in communication with the air floatation pool body; the return pump and the water output pipeline are coupled to each other, and the air intake pipeline and the return pump are coupled to each other; and the dissolved gas pipeline is coupled to the return pump and an end of the spiral water input pipeline;
wherein the air floatation pool body has an upper cone at the top opening of the air floatation pool body and a lower cone at the bottom opening of the air floatation pool body, and an air floatation pool is formed and enclosed by the upper cone, air floatation pool body and lower cone; the scum output pipeline is coupled to the top of the upper cone, and the water output pipeline is coupled to the bottom of the lower cone;

wherein the water output pipeline has a height adjustable upwardly with respect to the pipeline after the bottom of the lower cone is coupled to the outside;

wherein the spiral water input pipeline has an end sheathed and coupled to the water output pipeline and penetrates perpendicularly upward from an interface between the water output pipeline and the lower cone and deeply into the air floatation pool body such that the end of the spiral water input pipeline is at a center of the air floatation pool body;

wherein the end of the spiral water input pipeline forms a double-layer trumpet structure;

wherein the water output pipeline has a return pump inlet coupled to the return pump through a manual valve (a);

wherein the air intake pipeline comprises a manual globe valve (a), a liquid flow meter, a Venturi tube, a pipe mixer and a manual valve (b) sequentially coupled to one another, and the Venturi tube is coupled to a gas flow meter through an air pipe;

wherein the dissolved gas pipeline comprises a check valve, a manual globe valve (b), a dissolved gas pressure regulation can and a manual globe valve (c) sequentially coupled to one another; the return pump has an outlet coupled to the check valve, and the check valve prevents flowing fluid from returning to the return pump; the manual globe valve (c) is coupled to an end of the spiral water input pipeline; and the dissolved gas pressure regulation can has a pressure gauge and a pressure relief valve disposed thereon and coupled thereto; and wherein the spiral water input pipeline has a chemical addition port (b) disposed at a middle section of the spiral water input pipeline;

wherein the method comprises the steps of:
(a) introducing sewage into the water inlet of the spiral water input pipeline, while adding chemicals from the chemical addition port (a) and the chemical addition port (b) into the spiral water input pipeline, and both sewage and chemicals are spun, mixed, and reacted in the spiral water input pipeline to form a floc;

(b) passing the sewage with the floc obtained in the step (a) from the spiral water input pipeline through the bottom of the lower cone into the air floatation pool body;

(c) introducing the sewage that passes into the air floatation pool body through the water output pipeline and manual valve (a) into the return pump;

(d) introducing a part of the sewage contained in the return pump into the air intake pipeline, and into the liquid flow meter- and Venturi tube by adjusting the opening level of the manual globe valve (a); passing the sewage through a tapered throat of the Venturi tube to produce a negative pressure to suck air from the gas flow meter, and mixing the air introduced into the Venturi tube through the air pipe and further using a pipe mixer for the air mixing and a manual valve (b) for an adjustment of a flow rate of the air mixed with the sewage, and introducing the air mixed with the sewage into the return pump;

(e) pumping the remaining sewage from the return pump through the check valve and manual globe valve (b) into the dissolved gas pressure regulation can; dissolving the air contained in the sewage in the dissolved gas pressure regulation can at a specific pressure condition and introducing the dissolved air in the sewage; building up the pressure of the sewage by the manual globe valve (c) after the air is dissolved, and introducing the dissolved air from the dissolved gas pipeline into an end of the spiral water input pipeline, and mixing the air with the sewage of the dosing reaction to form a mixture of aerated water and reacted floc, and dispersing the air guided by the double-layer trumpet structure as a standard flow into the air floatation pool body; and (f) placing the mixture of the aerated water and the reacted floc formed in the step (e) into the air floatation pool body, lifting the floc by tiny air bubbles to form a scum, adjusting the water output pipeline to an appropriate height, so that the scum floats to the upper cone and enters into the scum output pipeline automatically; and flowing the sewage water into the water output pipeline of the lower cone.

11. The air floatation method of claim 10, wherein a part of a sediment contained in the sewage water and introduced into the water output pipeline of the lower cone is sucked into the return pump as described in the step (c).

* * * * *